(12) United States Patent  
Sun

(10) Patent No.: US 9,137,907 B2  
(45) Date of Patent: Sep. 15, 2015

(54) ELECTRONIC DEVICE

(71) Applicant: Wistron Corporation, New Taipei (TW)

(72) Inventor: Tsai-Yun Sun, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 322 days.

(21) Appl. No.: 13/852,878

(22) Filed: Mar. 28, 2013

(65) Prior Publication Data

US 2014/0029232 A1    Jan. 30, 2014

(30) Foreign Application Priority Data

Jul. 30, 2012   (TW) .............................. 101127493 A

(51) Int. Cl.
```
H05K 7/02      (2006.01)
H05K 7/04      (2006.01)
H05K 5/00      (2006.01)
G06F 1/16      (2006.01)
```
(52) U.S. Cl.
CPC ............ *H05K 5/0017* (2013.01); *G06F 1/1681* (2013.01)

(58) Field of Classification Search
USPC .................. 361/679.01, 679.02, 679.21, 810; 455/575.1–575.4; 345/204, 206
See application file for complete search history.

(56) References Cited

U.S. PATENT DOCUMENTS

| | | | |
|---|---|---|---|
| 6,430,038 B1 * | 8/2002 | Helot et al. ............... | 361/679.05 |
| 8,467,184 B2 * | 6/2013 | Chen et al. ............... | 361/679.55 |
| 8,654,520 B2 * | 2/2014 | Lin et al. .................. | 361/679.27 |
| 8,848,354 B2 * | 9/2014 | Sung et al. ............... | 361/679.27 |
| 2007/0210221 A1 * | 9/2007 | Kim et al. .................. | 248/124.1 |

FOREIGN PATENT DOCUMENTS

| | | |
|---|---|---|
| CN | 2765437 Y | 3/2006 |
| TW | 201106128 A1 | 2/2011 |

* cited by examiner

*Primary Examiner* — Hung S Bui

(74) *Attorney, Agent, or Firm* — Muncy, Geissler, Olds & Lowe, P.C.

(57) ABSTRACT

An electronic device includes a main body, a display, and a support element. The support element has one end being connected pivotally to the display and the other end being connected pivotally to the main body. The support element includes a first connecting member, a second connecting member, and a control device. The control device is used to control the connecting relationship among the display, the first connecting member and the second connecting member, so as the freedom degree of the position relationship between the display and the main body is adjustable.

11 Claims, 14 Drawing Sheets

ELECTRONIC DEVICE

FIELD

The exemplary embodiment(s) of the present invention relates to an electronic apparatus, especially to a portable electronic apparatus which a relative tilting angle between a main body and a display is changeable.

BACKGROUND

Computers have become one of the standing life tools to modern humans. Due to developments of the touch-controlled technique, most hand-held computers or electronic communication products replace mouse or entity keyboards with touch displays. The touch displays are widely used on tablet computers, smart phones or PDAs, and by co-operating with new operating systems which support the touch-controlled technique. A more intuitive and convenient operating feeling could be provided to users.

Laptops are equipped with inputting apparatuses such as QWERTY keyboards and touch pads, and the prior operating systems which have been already installed in the laptops do not support the touch-controlled input function, or the interface designs are not designed for the touch-controlled gesture operating. Thus the demands and designs of touch control on a traditional laptop are rare. However, in one aspect that the present operating system provider has already proposed an operating system which could support the touch-controlled operation on the laptops, and in another aspect that the users' demands of experiencing the touch-controlled operation just like that on the tablet computers or smart phones are rising daily and daily. Therefore, needs of providing a laptop which could be changed to a tablet computer are generated. In order to facilitate the display rotating relative to the main body of the laptop, a conventional technique uses a support arm or a linking-up component to support and connect pivotally the display of the laptop, thereby successfully changing the placement type or the tilting angle of the display relative to the main body.

Take a portable computer LifeBook TH40-d proposed by Fujitsu (please refer to the following websites: http://www.youtube.com/watch?v=LyZAPgfK2sA or http://article.pchome.net/content-1340323-4.html), the portable computer uses a single sheet-shaped support element to support the display, such that the display freely rotates relative to the support element, and thus changes the posture of the display relative to the main body (for example, the display could be face-up laminated on the main body, or the display could stand on the main body with a tilting angle), or changes the standing location and the tilting angle of the display relative to the main body so as to achieve the effect of standing the display. However, according to the aforementioned conventional design of using the support element for providing the support effect to the display, the single support element having fixed length is used, and the display could only rotate relative to the support element to change the tilting angle relative to the main body. Therefore, only regular adjustment effect could be provided, and when the display arrive the fixed position, the distance and the placement angle between the display and the user could not be adjusted. Thus, the freedom of placement for some users is still not enough. For examples, different users have different stature, or the same user puts the portable computer on different desks having different heights to operate the portable computer, or the same user sits on different chairs having different heights to operate the portable computer, the demands of the display tilting angles in these cases would be different. Therefore, there is a need to increase the freedom of the relative positions between the display and the main body of the portable computer. Except increasing the freedom of the relative positions between the display and the main body, it would be better for the user to freely choose the freedoms of the display.

Thus, it is worth studying that how to increase the adjustable freedom of the support element by designing the structure of the support element of the portable computer.

SUMMARY

It is a primary object of the present invention to provide a display having an increased adjustable freedom, for example, increase the adjustable freedom of display on the laptop.

To achieve the above object, the electronic apparatus of the present invention mainly comprises a main body, a display and a support element. The support element has one end being pivotally connected with the display and another end of the support element being pivotally connected with the main body. The support element further comprises a first connecting member, a second connecting member and a control device.

The control device is used to control the connecting relationship among the display, the first connecting member and the second connecting member.

According to a first embodiment, the connecting relationship among the display and the first connecting member has a first state and a second state, and the control device is used to control the connecting state between the display and the first connecting member. In the first state, the first connecting member is fixed on the display, and the position relationship among the display and the main body could be changed by the second connecting member. In the second state, one end of the first connecting member is departed from the display, and another end of the first connecting member is pivotally connected with the second connecting member. At this moment, the position relationship among the display and the main body could be changed through the first connecting member or/and the second connecting member.

According to a second embodiment, the connecting relationship among the first connecting member and the second connecting member has a first state and a second state, and the control device is used to control the connecting state between the first connecting member and the second connecting member. In the first state, the first connecting member and the second connecting member could not rotate relative to each other and thus a whole connecting member is formed, and the position relationship among the display and the main body could be changed by the whole connecting member. In the second state, a pivotal connection relationship is formed between the first connecting member and the second connecting member, and at this moment the position relationship among the display and the main body could be changed by the first connecting member or/and the second connecting member.

The control device mainly includes a first pushing block and a second pushing block. In two abovementioned embodiments, the user could push the first pushing block and the second pushing block from the first state to the second state. Besides, the control device further includes an elastic component, and when the user releases the applied force, the first pushing block and the second pushing block would back to the original position by the elastic component.

According to the object of the present invention, the freedom of the display in the first state is the same as the prior art by using a single connecting member. The freedom of the display in the second state is increased, and the freedom of adjusting positions and tilting angles between the display and the main body could be changed.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

The technical content of the invention will become more apparent from the following detailed description of several preferred embodiments.

Figure 1:
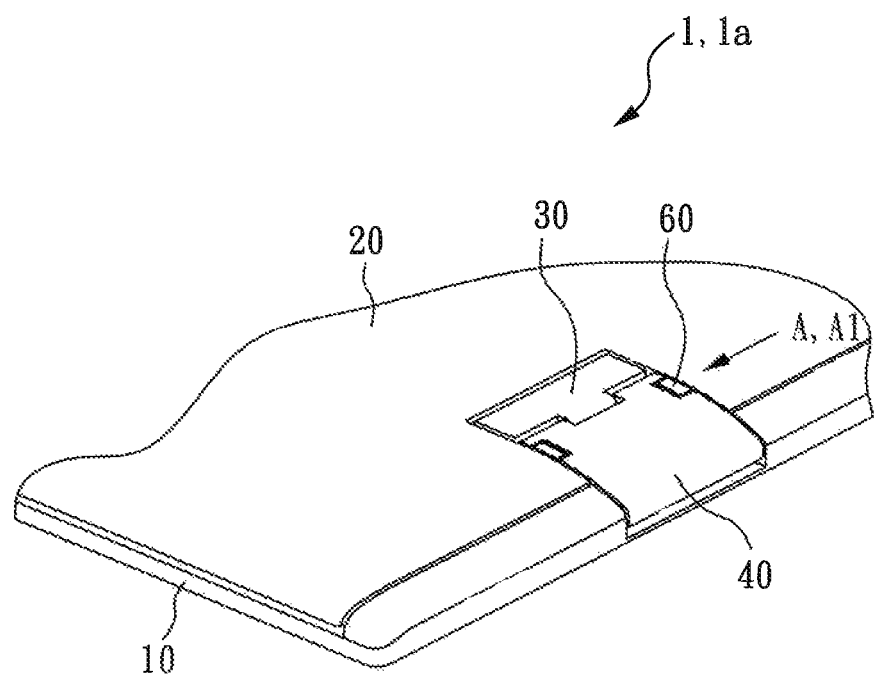
FIG. 1 is a stereogram of the first embodiment and the second embodiment in accordance with the present invention to illustrate the state of the display covering the main body.
Figure 2:
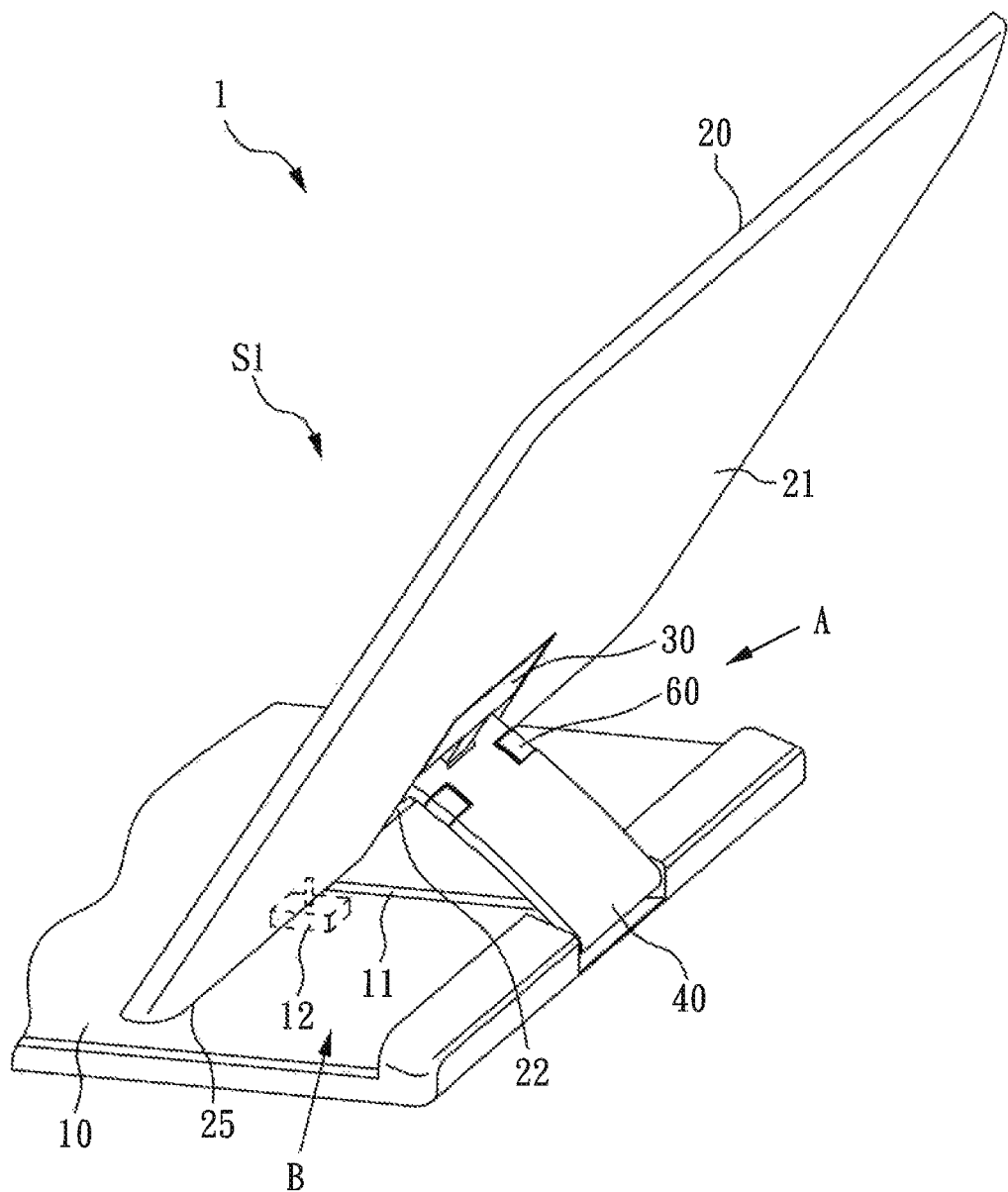
FIG. 2 is a stereogram of the first embodiment in accordance with the present invention to illustrate the first state.
Figure 3:
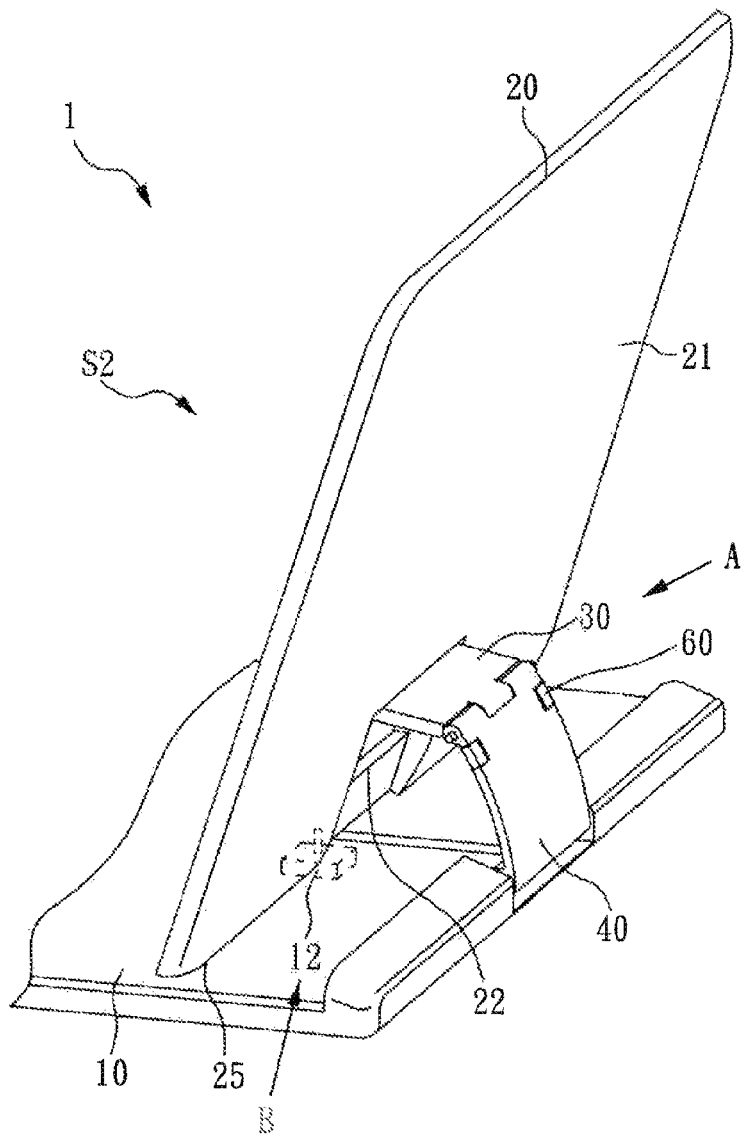
FIG. 3 is a stereogram of the first embodiment in accordance with the present invention, to illustrate the second state.

Please refer to FIG. 1 to FIG. 3, which are related to the base structures of a first embodiment of the present invention. The electronic apparatus 1 of the present invention comprises a main body 10, a display 20 and a support element A. In this embodiment, the electronic apparatus 1 is a laptop. A recess 22 is disposed on a back surface 21 of the display 20, such that the support element A is accommodated and hidden in the recess 22 but is not protruded out of the back surface 21 (as shown in FIG. 1) when the display 20 downwardly covers the main body 10.

The main characteristic of the present invention is a design which the support element A includes a first connecting member 30 and a second connecting member 40 connected with each other. Please refer to FIG. 3 to FIG. 8 at the same time, which are detail structure diagrams of the first embodiment.

Figure 4:
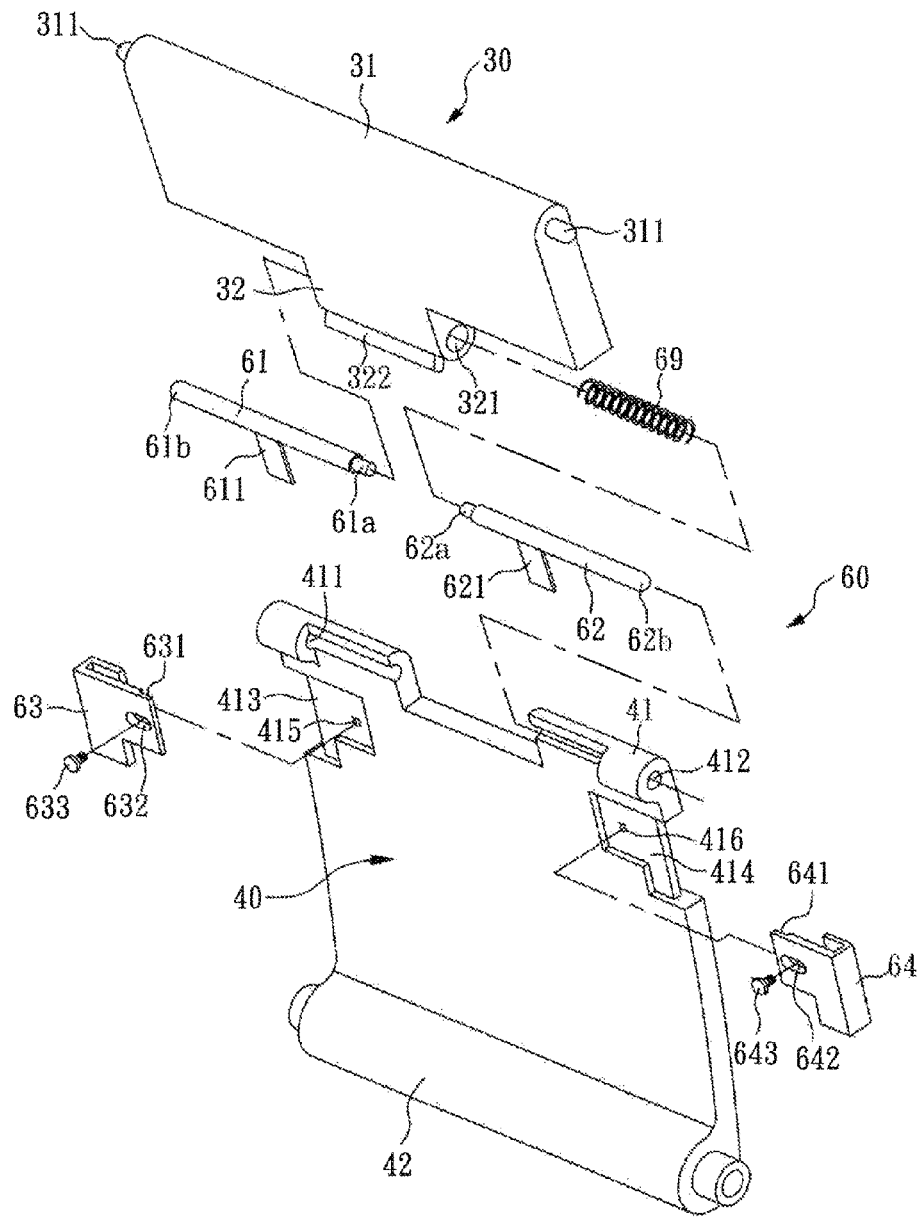
FIG. 4 is a exploded view of the first connecting member, the second connecting member and the control device in accordance with the present invention.

The first connecting member 30 is substantially rectangular. The first connecting member 30 includes a first end 31 and a second end 32, and the first end 31 and the second end 32 are top-bottom opposed. As shown in FIG. 4, two sides of the first end 31 include respectively a positioning shaft 311. The second end 32 includes a trough aperture 321 and a stopping portion 322.

The second connecting member 40 includes a third end 41 and a fourth end 42, wherein the third end 41 connects pivotally to the second end 32 of the first connecting member 30, and the fourth end 42 also connects pivotally to the main body 10, as shown in FIG. 3.

As shown in FIG. 4, two sides of the third end 41 of the second connecting member 40 include respectively a first trough aperture 411, a first recess portion 413, a second trough aperture 412 and a second recess portion 414. A first fastening aperture 415 and a second fastening aperture 416 are disposed respectively on the first recess portion 413 and the second recess portion 414.

Another characteristic of the present invention is the support element A further including a control device 60. The control device 60 includes a first pivot rod 61 having a first engaging member 611, a second pivot rod 62 having a second engaging member 621, an elastic component 69 (such as a spring), a first pushing block 63 and a second pushing block 64.

The elastic component 69 inserts into the trough aperture 321 of the first connecting member 30, and the elastic component 69 is disposed in the trough aperture 321. The adjacent two inner ends 61a, 62a of the first pivot rod 61 and the second pivot rod 62 push both sides of the elastic component 69 respectively. The outer end 61b of the first pivot rod 61 penetrates the first trough aperture 411, and then the outer end 2b of the second pivot rod 62 penetrates the second trough aperture 412. Therefore, by the first pivot rod 61 and the second pivot rod 62, the third end 41 of the second connecting member 40 connects pivotally to the second end 32 of the first connecting member 30 so as to form the support element A.

The first pushing block 63 includes a first pushing member 631 having a ladder shape, a first sliding aperture 632 and a first positioning member 633. The structure of the second pushing block 64 is symmetric to the first pushing block 63, and the second pushing block 64 includes a second pushing member 641 having a ladder shape, a second sliding aperture 642 and a second positioning member 643.

The first pushing block 63 is disposed at a location of the first recess portion 413, and the first positioning member 633 (such as a screw) penetrates through the first sliding aperture 632 (such as a long ellipse hole) and combines with the first fastening aperture 415. The second pushing block 64 is disposed at a location of the second recess portion 414, and the second positioning member 643 (such as a screw) penetrates through the second sliding aperture 642 (such as a long ellipse hole) and combines with the second fastening aperture 416.

Figure 5:
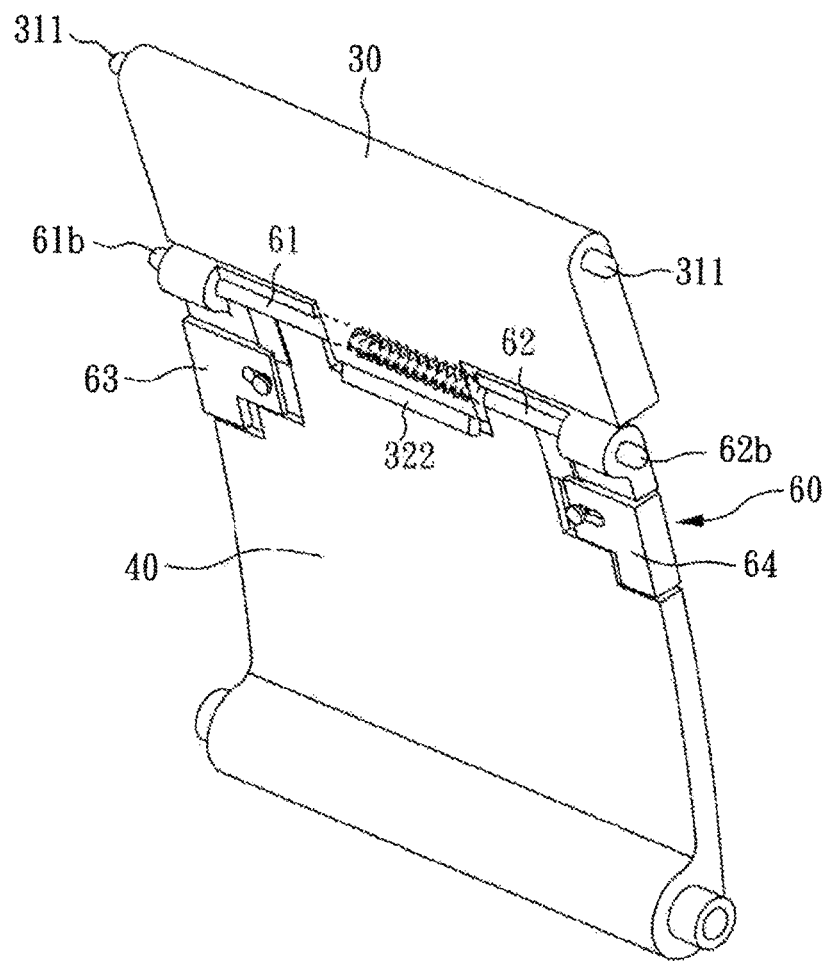
FIG. 5 is a combined diagram of the first connecting member, the second connecting member and the control device in accordance with the present invention.
Figure 6:
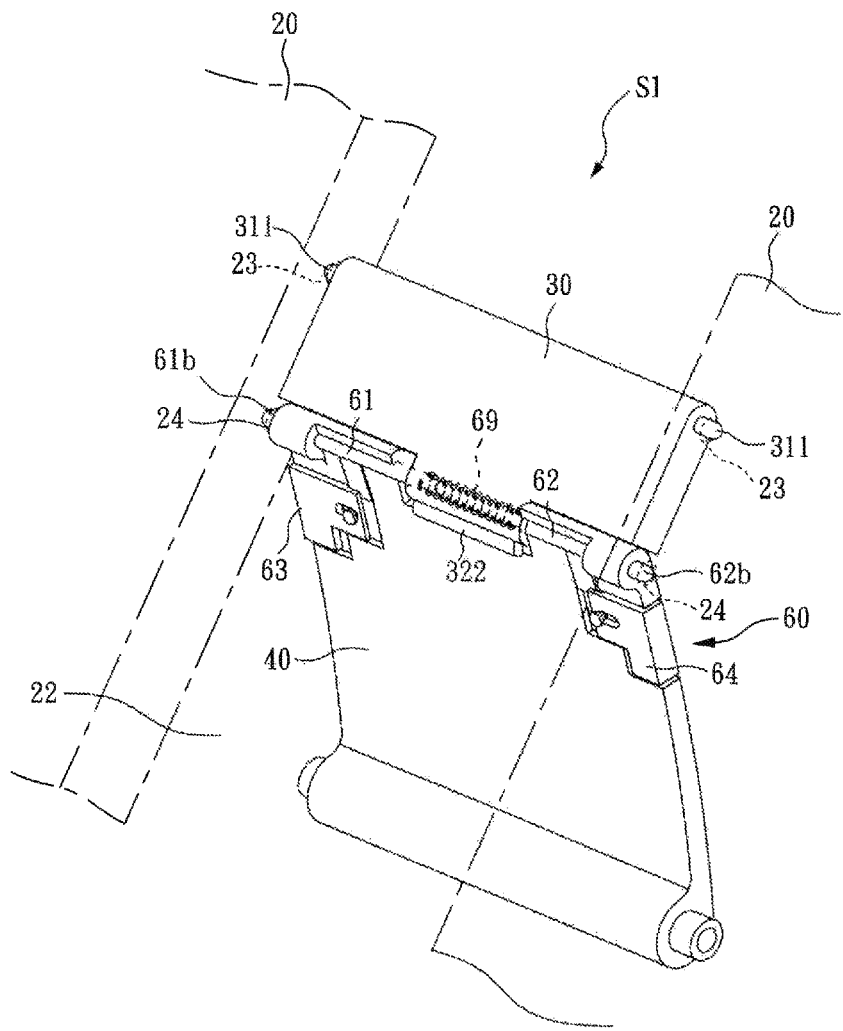
FIG. 6 is a schematic diagram of the first connecting member, the second connecting member, the control device and the display in the first state in accordance with the present invention.
Figure 7:
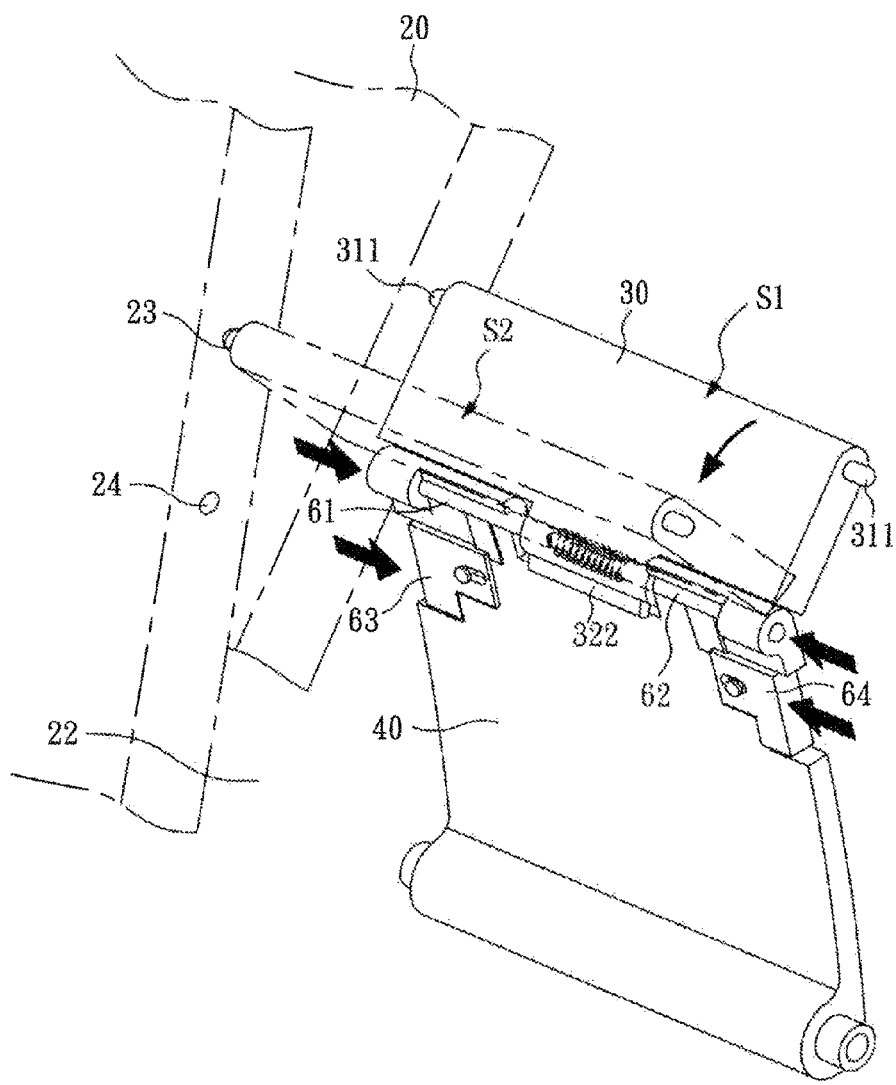
FIG. 7 is a schematic diagram of the first connecting member, the second connecting member, the control device and the display in the second state in accordance with the present invention.

After assembling the control device 60, the first pushing member 631 engages with the first engaging member 611, and the second pushing member 641 also engages with the second engaging member 621 (as shown in FIG. 5 to FIG. 7).

Since the first sliding aperture 632 and the second sliding aperture 642 could accommodate the first positioning member 633 and the second positioning member 643, and the first positioning member 633 and the second positioning member 643 are allowed to move in the first sliding aperture 632 and the second sliding aperture 642, the first pushing block 63 and the second pushing block 64 could be pressed to move a specific distance under the external force applied inwardly.

When the first pushing block 63 and the second pushing block 64 are not pressed inwardly, by the intrinsic properties of the elastic component 69 (such as a compression spring), the elastic component 69 pushes the first pivot rod 61 and the second pivot rod 62 outwardly in the state that the elastic component 69 is not pressed, and thus the outer end 61b of the first pivot rod 61 and the outer end 62b of the second pivot rod 62 engage with two second positioning holes 24 disposed correspondingly on both sides of the recess 22 of the display 20, as shown in FIG. 6. Besides, two corresponding first positioning holes 23 are disposed in places above the second positioning holes 24 of the recess 22 with a predetermined interval, such that the positioning shafts 311 disposed on both sides of the first end 31 of the first connecting member 30 engage with the first positioning hole 23. In the first state S1, as shown in FIG. 2 and FIG. 6, the first connecting member 30 is substantially adhered to the recess 22 on the back surface 21. The third end 41 of the second connecting member 40 and the second end 32 of the first connecting member 30 connect pivotally to the display 20, and thus the second connecting member 40 is used alone as the support structure of the display 20. Therefore, in the first state S1, the display 20 rotates around the second end 32 of the first connecting member 30, which is regards as a shaft, relative to the second connecting member 40. The position relationship and the tilting angle between the display 20 and the main body 10 are changed.

Figure 8:
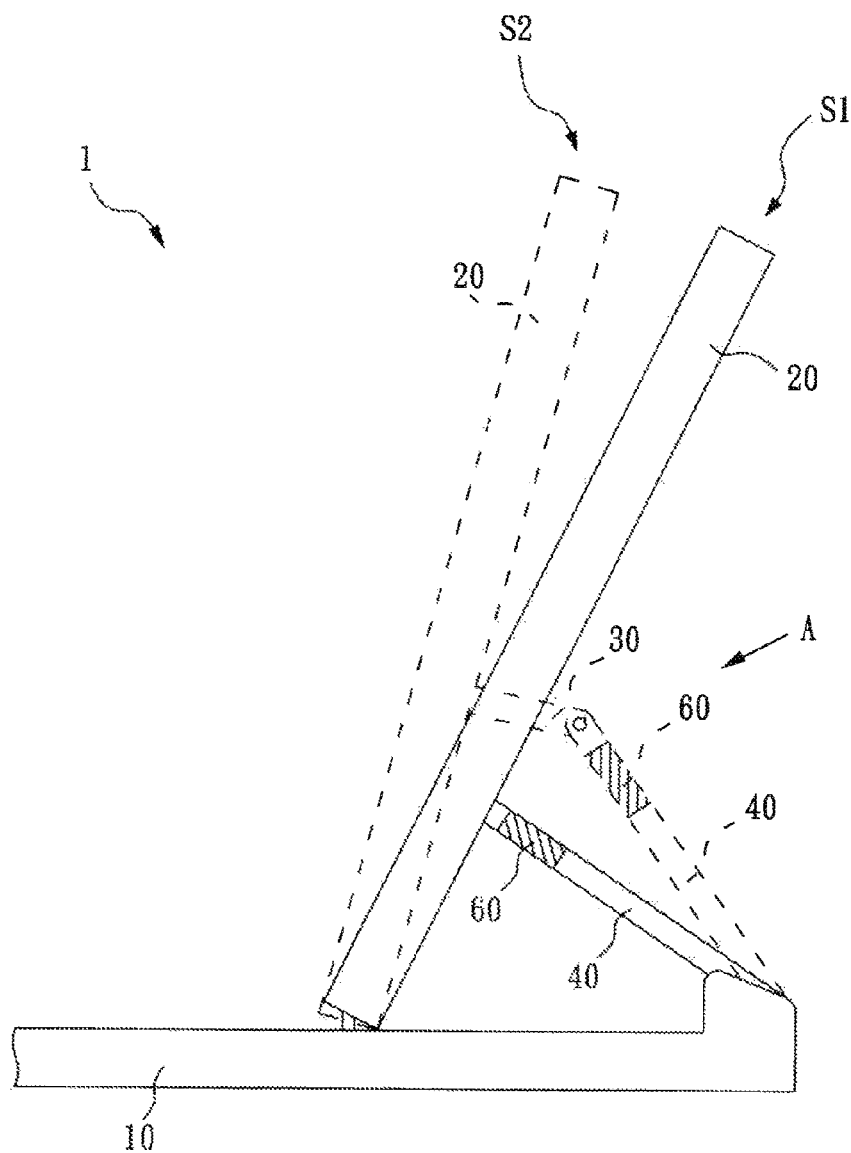
FIG. 8 is a lateral view of the first embodiment in the first state and the second state in accordance with the present invention.

Please refer to FIG. 7, when the first pushing block 63 and the second pushing block 64 are pressed inwardly, the first pushing member 631 and the second pushing member 641 push the first engaging member 611 and the second engaging member 621 respectively, such that the first pivot rod 61 and the second pivot rod 62 move inwardly and press the elastic component 69. Therefore, the outer end 61b of the first pivot rod 61 and the outer end 62b of the second pivot rod 62 depart from the two second positioning holes 24 and form the state as shown in FIG. 7. In the second state S2, as shown in FIG. 3 and FIG. 7, the third end 41 of the second connecting member 40 and the second end 32 of the first connecting member 30 are departed from the recess 22 together. However, the first end 31 of the first connecting member 30 still connects pivotally to the display 20, and the first connecting member 30 and the second connecting member 40 are together used as the support structure of the display 20, such that the display 20 rotates around the first end 31 of the first connecting member 30, which is regarded as a shaft, relative to the first connecting member 30. At this moment, another tilting angle could be generated between the display 20 and the main body 10 in a state which the bottom of the display 20 (i.e. the connecting end 25 as shown in FIG. 2 and FIG. 3) is fixed relative to the main body 10. For example, as shown in FIG. 8, a smaller tilting angle of the display 20 in the first state S1 is changed to a larger tilting angle of the display 20 in the second state S2. In the state S2, a stopping effect is generated between the first connecting member 30 and the second connecting member 40 by the stopping portion 322 to limit the rotating angle of the first connecting member 30 rotated toward the arrow direction relative to the second connecting member 40. It could avoid over-rotating of the display 20 so as to affect the operation of the display 20.

Please refer to FIG. 9 to FIG. 14, which are related to a second embodiment of the present invention. The electronic apparatus 1a is a laptop. A recess 22 is disposed on the back surface 21 of the display 20. When the display 20 covers the main body 10, the support element A1, which is formed by connecting the first connecting member 30a and the second connecting member 40a, is not protruded out of the recess 22 (as shown in FIG. 1). The main differences between the first embodiment and the second embodiment are the detail structures and the operations of the first connecting member 30a, the second connecting member 40a and the control device 60a.

The first connecting member 30a is substantially rectangular, and the first connecting member 30a includes a first end 31 and a second end 32. Two sides of the first end 31 include respectively a positioning shaft 311. The second end 32 includes a long trough aperture 323, a first stopping member 325 and a second stopping member 326.

Figure 9:
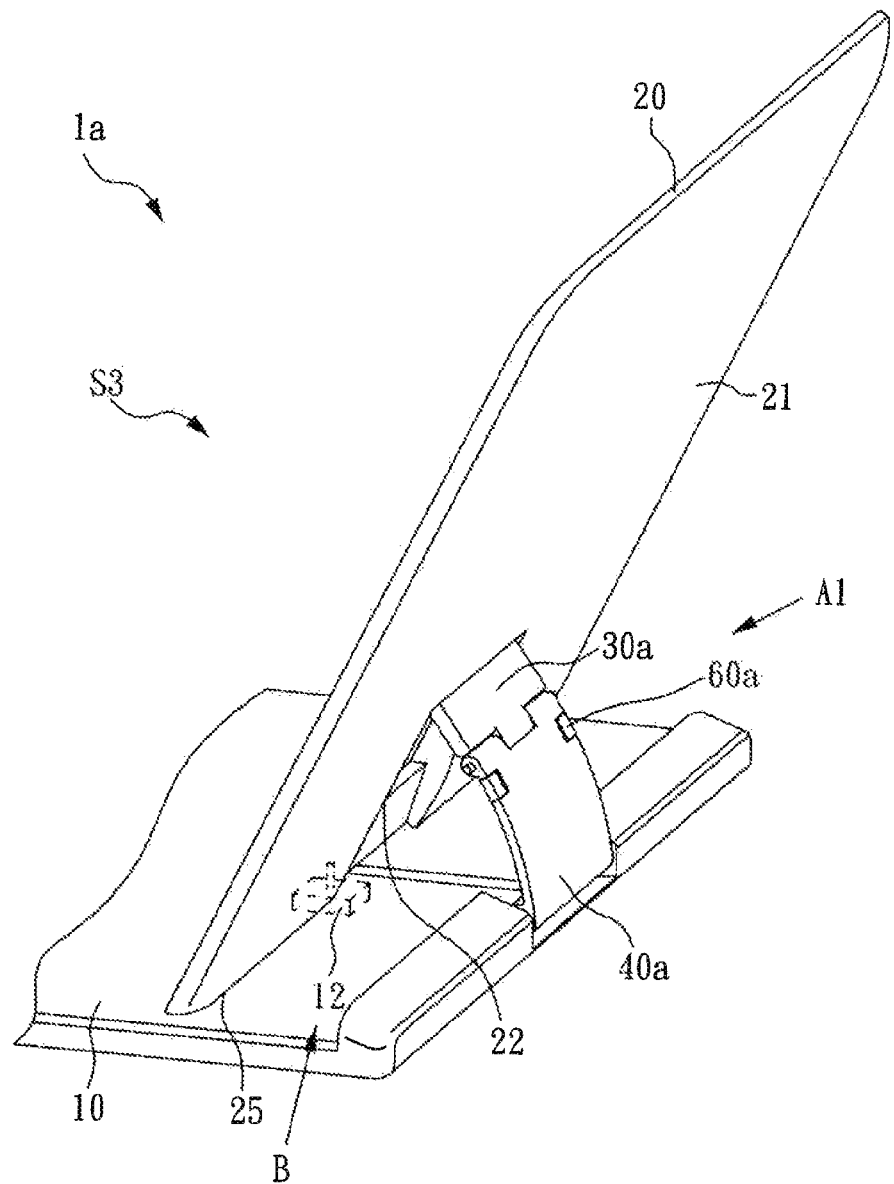
FIG. 9 is a stereogram of the second embodiment in accordance with the present invention to illustrate the first state.

The second connecting member 40a includes a third end 41 and a fourth end 42, wherein the third end 41 connects to the second end 32 of the first connecting member 30a, and the fourth end 42 connects pivotally to the main body 10, as shown in FIG. 9.

Two sides of the third end 41 include respectively a first trough aperture 411, a first recess portion 413, a second trough aperture 412 and a second recess portion 414. A first fastening aperture 415, a first hook member 417, a second fastening aperture 416 and a second hook member 418 are disposed respectively on the first recess portion 413 and the second recess portion 414.

The control device 60a includes a main pivot rod 67, a first pushing block 63 and a second pushing block 64.

The main pivot rod 67 penetrates through the long trough aperture 323, the first trough aperture 411 and the second trough aperture 412, and the third end 41 of the second connecting member 40a connects pivotally to the second end 32 of the first connecting member 30a by the main pivot rod 67.

The first pushing block 63 includes a first stopping block 635, a first elasticity recovery member 638, a third hook member 637, a first sliding aperture 632 and a first positioning member 633; the second pushing block 64 is structurally symmetric to the first pushing block 63, and the second pushing block 64 includes a second stopping block 645, a second elasticity recovery member 648, a fourth hook member 647, a second sliding aperture 642 and a second positioning member 643.

The first pushing block 63 is disposed at a location of the first recess portion 413, and the first positioning member 633 (such as a screw) penetrates through the first sliding aperture 632 (such as a long ellipse hole) and combines with the first fastening aperture 415. The second pushing block 64 is disposed at a location of the second recess portion 414, and the second positioning member 643 (such as a screw) penetrates through the second sliding aperture 642 (such as a long ellipse hole) and combines with the second fastening aperture 416.

Figure 12:
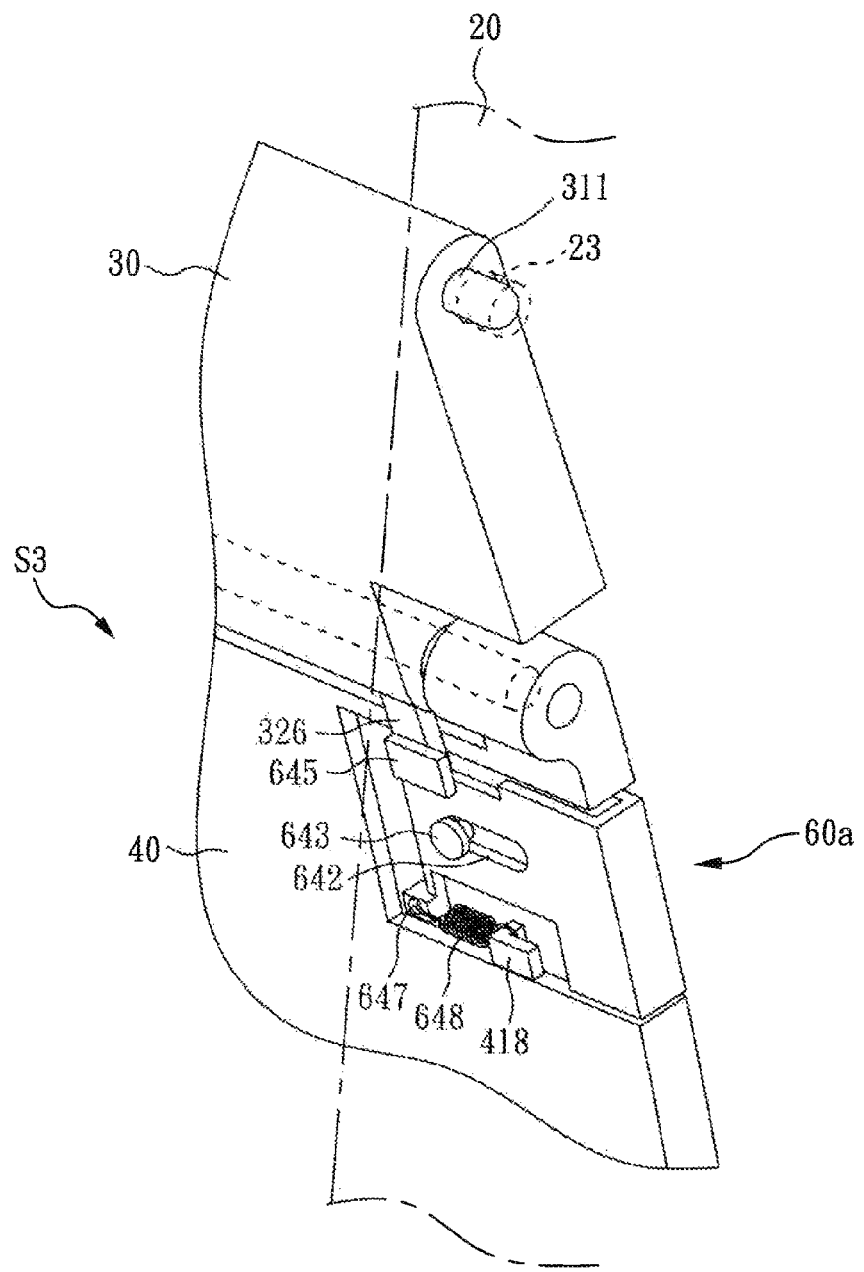
FIG. 12 is a combined diagram of the first connecting member, the second connecting member and the control device of the second embodiment in accordance with the present invention to illustrate the first state.

After assembling the control device 60, the first stopping block 635 blocks the first stopping member 325 mutually, and the second stopping block 645 blocks the second stopping member 326 mutually (as shown in FIG. 12). Besides, the first elasticity recovery member 638 connects with the first hook member 417 and the third hook member 637, and the second elasticity recovery member 648 connects with the second hook member 418 and the fourth hook member 647. Since the first sliding aperture 632 and the second sliding aperture 642 could accommodate the first positioning member 633 and the second positioning member 643, such as screws, and allow the first positioning member 633 and the second positioning member 643 move therein, the first pushing block 63 and the second pushing block 64 could be pressed inwardly and move a specific distance. When the pressing force is released, the first pushing block 63 and the second pushing block 64 are recovered by the elastic recovery force of the first elasticity recovery member 638 and the second elasticity recovery member 648.

Figure 11:
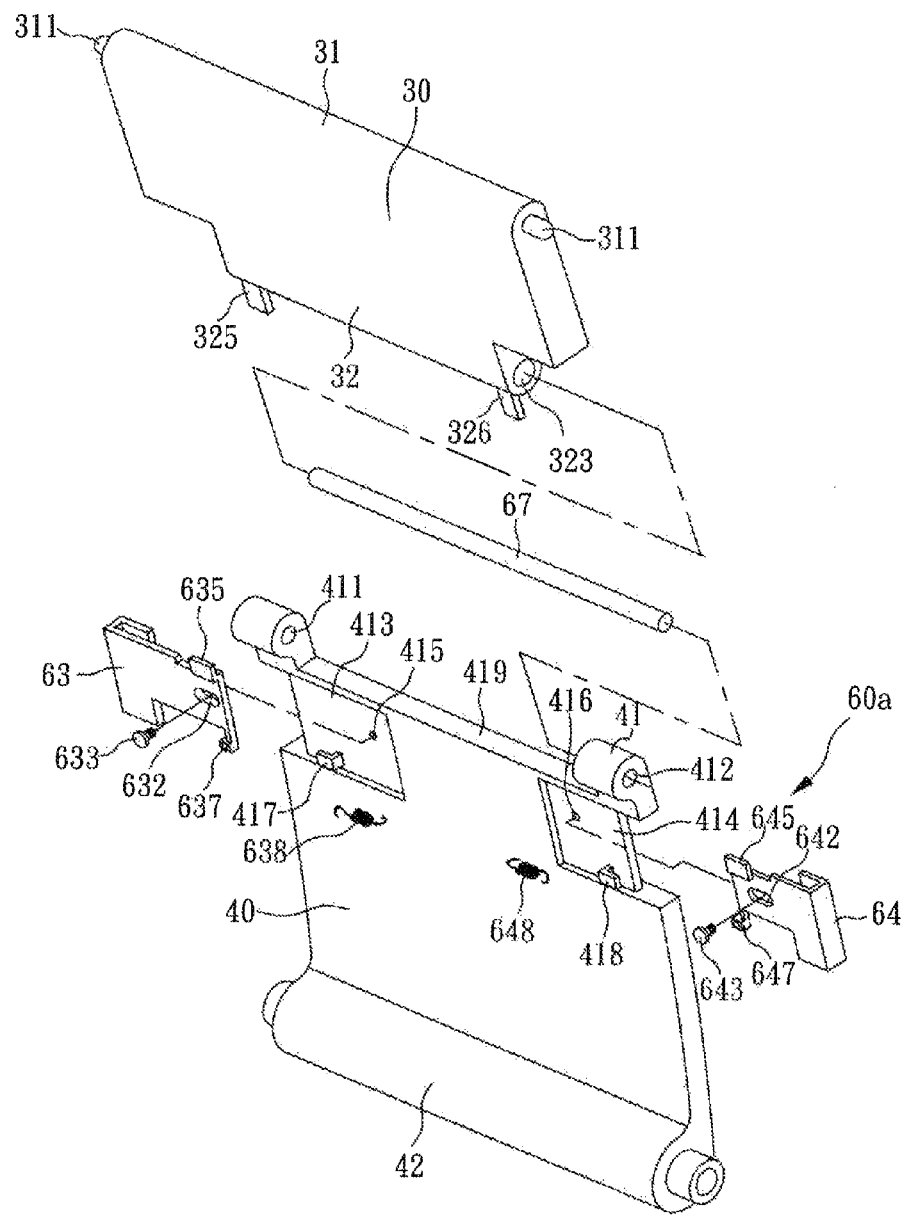
FIG. 11 is a exploded view of the first connecting member, the second connecting member and the control device of the second embodiment in accordance with the present invention.

As shown in FIG. 11 to FIG. 12, when the first pushing block 63 and the second pushing block 64 are not pressed inwardly, the first stopping block 635 blocks the first stopping member 325 mutually, and the second stopping block 645 blocks second stopping member 326 mutually; thus, the first connecting member 30a could not rotate clockwise as shown in the figures relative to the second connecting member 40a. Actually, the first connecting member 30a also could not rotate counter-clockwise as shown in the figures relative to the second connecting member 40a, because the first stopping member 325 and the second stopping member 326 block a leading edge 419 of the third end 41 of the second connecting member 40a. In the first state S3, as shown in FIG. 9 and FIG. 12, the first positioning hole 23 is disposed respectively on two sides of the recess 22 on the back surface 21 similar to the first embodiment (FIG. 12 only shows the first positioning hole 23 on one side). The positioning shaft 311 disposed on two sides of the first end 31 of the first connecting member 30a connect pivotally to the first positioning holes 23, and therefore the first end 31 of the first connecting member 30a is connected pivotally to the display 20 (as shown in FIG. 9). The third end 41 of the second connecting member 40a engages with the second end 32 of the first connecting member 30a, and a piece of structure support element A1 is formed by connecting the first connecting member 30a and the second connecting member 40a as a whole. In the state S3, the position relationship and the tilting angle of the display 20 relative to the main body 10 are changed by the rotating of the whole firm support element A1 (because the first connecting member 30a could not be rotated relative to the second connecting member 40a so as to form the whole firm support element A1).

Figure 10:
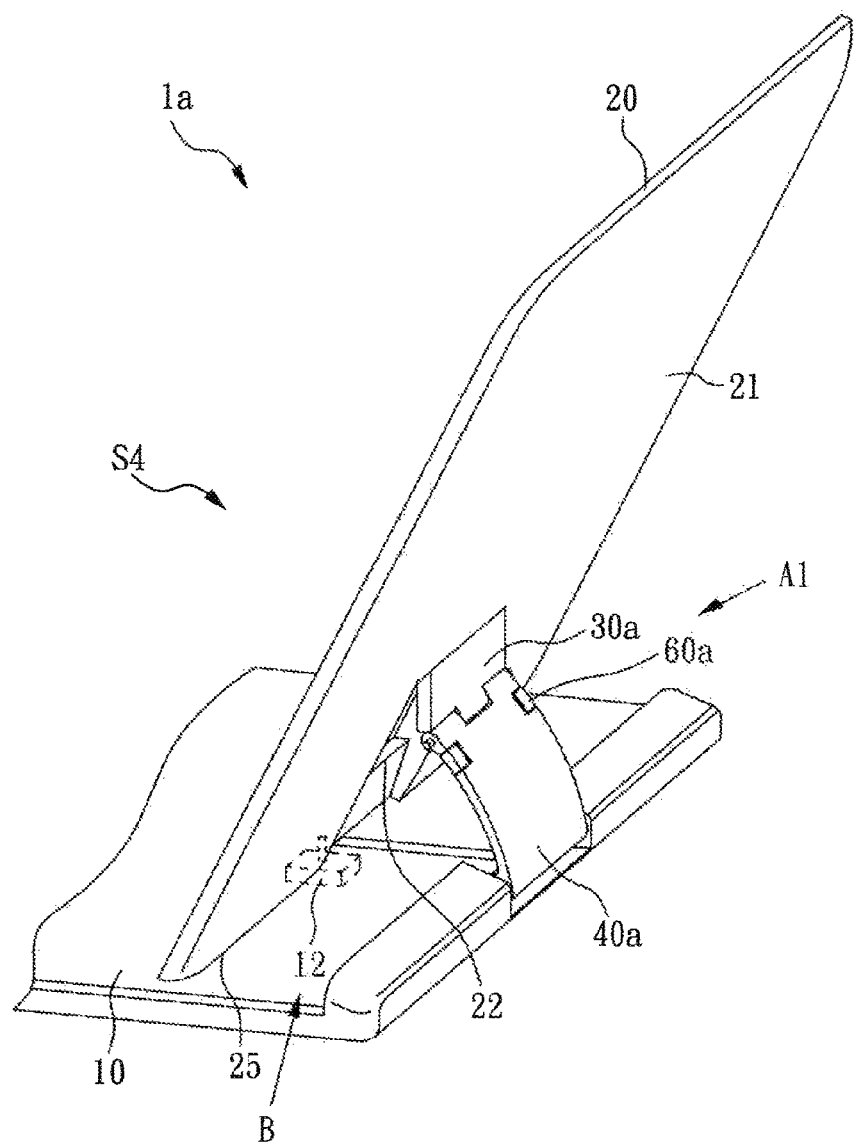
FIG. 10 is a stereogram of the second embodiment in accordance with the present invention to illustrate the second state.
Figure 13:
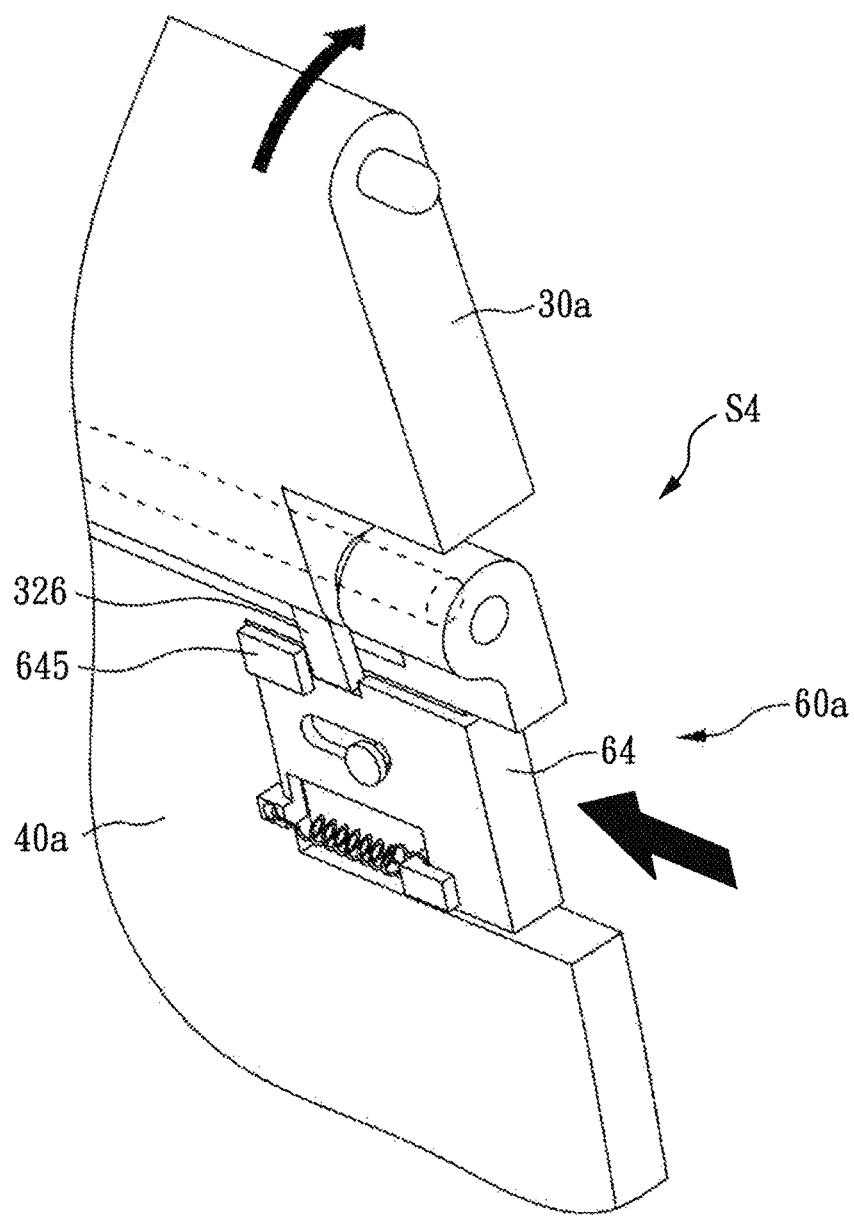
FIG. 13 is a combined diagram of the first connecting member, the second connecting member and the control device of the second embodiment in accordance with the present invention to illustrate the second state.
Figure 14:
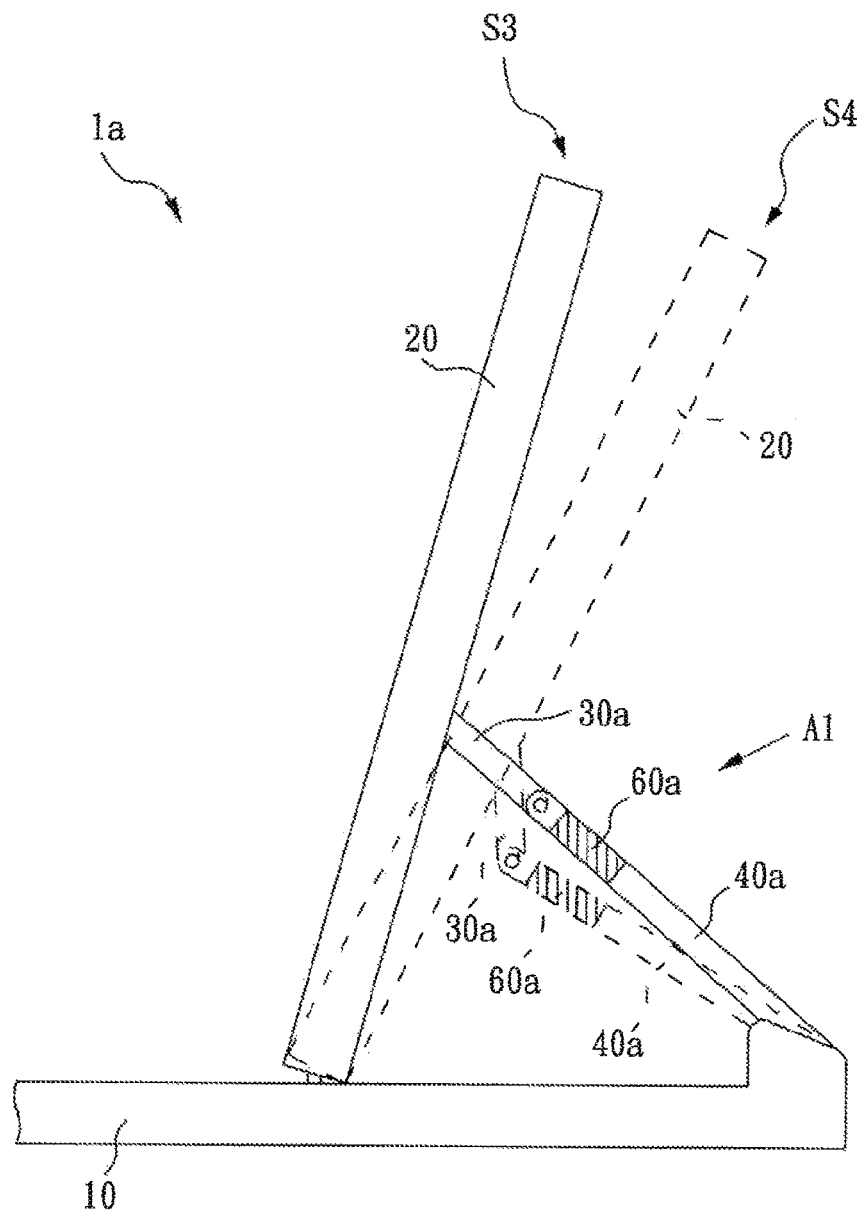
FIG. 14 is a lateral view of the second embodiment in the first state and the second state in accordance with the present invention.

Please refer to the second state S4 as shown in FIG. 10 and FIG. 13. When the first pushing block 63 and the second pushing block 64 are pressed inwardly, the first stopping block 635 and the second stopping block 645 are moving inwardly, such that the first stopping member 325 dose not block the first stopping block 635, and the second stopping member 326 dose not block the second stopping block 645. Therefore, the first connecting member 30a could rotate clockwise relative to the second connecting member 40a as shown in the figures. At this moment, another tilting angle could be generated between the display 20 and the main body 10 at the in the state which the bottom of the display 20 is fixed relative to the main body 10. For example, as shown in FIG. 14, a larger tilting angle of the display 20 in the first state S3 is changed to a smaller tilting angle of the display 20 in the second state S4.

According to the above two embodiments, the freedom of the display in the first state is equal to the prior arts that use single support element, but the freedom of the display in the second state could be further increased. Thus, the relative position and the tilting angle between the display and the main body could be changed flexibly and depends on the real demands required by the users.

In the above two embodiments, there could be no connection relationship between the bottom of the display 20 and the main body 10, and the bottom of the display 20 could freely move on the top surface of the main body 10, or be departed from the main body 10 and suspended to move freely. However, in designs of the bottom of the display 20, a suitable connection between the bottom of the display 20 and the main body also could be provided by a connecting apparatus B, like in FIG. 2 and FIG. 3 of the aforementioned first embodiment or in FIG. 9 and FIG. 10 of the aforementioned second embodiment. The connecting apparatus B includes a slit 11 disposed on a top surface of the main body 10 and a sliding member 12 (such as a sliding block) which is allowed sliding in the slit 11. One part of the sliding member 12 penetrates the slit 11 and connects to the connecting end 25 of the display 20, and the connecting end 25 is moved with the sliding of the sliding member 12 when the display 20 rotates relative to the main body 10. The bottom of the display 20 is always close to the top surface of the main body 10 when the display 20 rotates and slides back and forth relative to the main body 10. However, this kind of connecting apparatus B is only a practicable example. The connecting apparatus B may be a magnetic device disposed on the bottom of the display 20 or the top surface of the main body 10, and another magnetic device or iron element disposed on the other one. It is a structure which could avoid the bottom of the display 20 departing from the main body 10, also protected by the claims of the present invention.

As described above, the objectives, means, and effectiveness in the present invention are different from the characteristics in the prior art. It should be noted that the embodiments described above are for illustrating the principles and effects of the present invention, and not for limiting the scope of the present invention. Any person skilled in the art shall be able to make modifications and changes to the embodiments without departing from the technical principle and spirit of the present invention. The claims of the present invention within the scope of protection are described below.

What is claimed is:
1. A portable electronic apparatus, comprising:
    a main body;
    a display; and
    a support element, having one end being pivotally connected with the display and another end being pivotally connected with the main body, the support element comprising:
        a first connecting member, including a first end and a second end, wherein the first end is pivotally connected with the display;
        a second connecting members, including a third end and a fourth end, wherein the third end is pivotally connected with the second end of the first connecting member, and the fourth end is pivotally connected with the main body; and
        a control device, disposed at a location of the third end of the second connecting member connecting with the second end of the first connecting member, and the control device being operated such that the first connecting member forming a first state and a second state relative to the second connecting member;
    wherein:
        in the first state, the first end and the second end of the first connecting member are respectively pivotally connected with the display, such that the first connecting member is fixed on the display, and the display only rotates around the second end of the first connecting member as a shaft, relative to the second connecting member, in the second state, the second end of the first connecting member pivotally connected to the third end of the second connecting member is out of a pivotal connection state with the display, such that the display rotates around the first end of the first connecting member as a shaft, relative to the first connecting member, the display further includes a recess, two first positioning holes and two second positioning holes are respectively disposed on two sides of the recess with predetermined intervals, and the first positioning holes are corresponded to the second positioning holes;

the first end of the first connecting member further includes two positioning shafts;

the second end of the first connecting member further includes a trough aperture;

the third end of the second connecting member further includes a first trough aperture and a second trough aperture;

the control device further includes a first pivot rod and a second pivot rod, adjacent two inner ends of the first pivot rod and the second pivot rod are disposed through two ends of the trough aperture; an outer end of the first pivot rod penetrates the first trough aperture, and an outer end of the second pivot rod penetrates the second trough aperture;

in the first state, not only the two positioning shafts combine with the two first positioning holes, but the outer ends of the first pivot rod and the second pivot rod combine respectively with the two second positioning holes, such that the display only rotates around the first pivot rod and the second pivot rod as shafts, relative to the second connecting member; and in the second state, the outer ends of the first pivot rod and the second pivot rod respectively depart from the two second positioning holes, such that the display only rotates around the positioning shafts of the first connecting member as shafts, relative to the first connecting member.

2. The portable electronic apparatus as claim 1, wherein the control device further includes a first pushing block and a second pushing block selectively controlled the state of combining the first pivot rod and the second pivot rod with the two second positioning holes, or departing the first pivot rod and the second pivot rod from the two second positioning holes.

3. The portable electronic apparatus as claim 2, wherein the control device further includes an elastic component disposed in the trough aperture, and the adjacent two inner ends of the first pivot rod and the second pivot rod push and connect to two ends of the elastic component.

4. The portable electronic apparatus as claim 3, wherein:
the first pivot rod further includes a first engaging member, and the second pivot rod further includes a second engaging member; and
the first pushing block further includes a first pushing member, and the second pushing block further includes a second pushing member, wherein the first pushing member engages with the first engaging member, and the second pushing member engages with the second engaging member.

5. The portable electronic apparatus as claim 4, wherein:
the third end of the second connecting member further includes a first fastening aperture and a second fastening aperture; and
the first pushing block further includes a first positioning member and a first sliding aperture, and the second pushing block further includes a second positioning member and a second sliding aperture, wherein the first positioning member penetrates through the first sliding aperture and combines with the first fastening aperture, and the second positioning member penetrates through the second sliding aperture and combines with the second fastening aperture.

6. A portable electronic apparatus, comprising:
a main body;
a display, further includes a recess, and two first positioning holes are disposed correspondingly on two sides of the recess; and
a support element, having one end being pivotally connected with the display and another end being pivotally connected with the main body, the support element comprising:
a first connecting member, including a first end and a second end, wherein two sides of the first end of the first connecting member further include a positioning shaft, and each positioning shaft is pivotally connected with the first positioning hole correspondingly;
a second connecting member, including a third end and a fourth end, wherein the third end is pivotally connected with the second end of the first connecting member, and the fourth end is pivotally connected with the main body; and
a control device, disposed at a location of the third end of the second connecting member connecting with the second end of the first connecting member, and the control device being operated such that the first connecting member forming a first state and a second state relative to the second connecting member,
wherein in the first state, the third end of the second connecting member is fixed to the second end of the first connecting member, and the third end of the second connecting member could not rotate relative to the second end of the first connecting member, such that the display rotates only around the first end of the first connecting member as a shaft, relative to the first connecting member, and
wherein in the second state, the third end of the second connecting member pivotally rotates relative to the second end of the first connecting member.

7. The portable electronic apparatus as claim 6, wherein the control device further includes a first pushing block and a second pushing block selectively controlled the state of engaging the first connecting member with the second connecting member, or departing the first connecting member from the second connecting member.

8. The portable electronic apparatus as claim 7, wherein:
the second end of the first connecting member further includes a long trough aperture;
the third end of the second connecting member further includes a first trough aperture and a second trough aperture; and
the control device further includes a main pivot rod, the main pivot rod is disposed through the long trough aperture, the first trough aperture and the second trough aperture.

9. The portable electronic apparatus as claim 8, wherein:
the first end of the first connecting member further includes a first fastening aperture and a second fastening aperture; and
the first pushing block further includes a first positioning member and a first sliding aperture, and the second pushing block further includes a second positioning member and a sliding trough aperture, wherein the first positioning member penetrates through the first sliding aperture and combines with the first fastening aperture, and the second positioning member penetrates through the second sliding aperture and combines with the second fastening aperture.

10. The portable electronic apparatus as claim 9, wherein:

the second end of the first connecting member further includes a first stopping member and a second stopping member; and the first pushing block further includes a first stopping block, and the second pushing block further includes a second stopping block, wherein:

in the first state, the first stopping member and the first stopping block block each other, the second stopping member and the second stopping block block each other, and the second connecting member is fixed to the first connecting member, such that the second connecting member could not rotate relative to the first connecting member; and in the second state, the first stopping member and the first stopping block do not block each other, and the second stopping member and the second stopping block do not block each other, such that the second connecting member rotates pivotally relative to the first connecting member.

11. The portable electronic apparatus as claim 10, wherein:

the third end of the second connecting member further includes a first hook member and a second hook member; and the first pushing block further includes a third hook member and a first elasticity recovery member, and the second pushing block further includes a fourth hook member and a second elasticity recovery member, wherein the first elasticity recovery member connects with the first hook member and the third hook member, and the second elasticity recovery member connects with the second hook member and the fourth hook member.

* * * * *